US006007758A

United States Patent [19]

Fleming et al.

[11] Patent Number: 6,007,758

[45] Date of Patent: Dec. 28, 1999

[54] PROCESS FOR FORMING DEVICE COMPRISING METALLIZED MAGNETIC SUBSTRATES

[75] Inventors: Debra Anne Fleming, Berkeley Heights, N.J.; Gideon S. Grader, Haifa, Israel; David Wilfred Johnson, Jr., Bedminster, N.J.; Vincent George Lambrecht, Jr., Millington, N.J.; John Thomson, Jr., Spring Lake, N.J.

[73] Assignee: Lucent Technologies Inc., Murray Hill, N.J.

[21] Appl. No.: 09/021,500

[22] Filed: Feb. 10, 1998

[51] Int. Cl.[6] ..... B29C 65/02

[52] U.S. Cl. ..... 264/429

[58] Field of Search ..... 264/429

[56] References Cited

U.S. PATENT DOCUMENTS

| | | | |
|---|---|---|---|
| 3,731,005 | 5/1973 | Shearman | 179/100.2 C |
| 3,812,442 | 5/1974 | Muckelroy | 336/83 |
| 4,689,594 | 8/1987 | Kawabata et al. | 336/200 |
| 4,985,098 | 1/1991 | Kohno et al. | 156/89 |
| 5,001,014 | 3/1991 | Charles et al. | 428/472 |
| 5,239,744 | 8/1993 | Fleming et al. | 29/602 |
| 5,349,743 | 9/1994 | Grader et al. | 29/602 |
| 5,389,428 | 2/1995 | Fleming et al. | 428/209 |
| 5,479,695 | 1/1996 | Grader et al. | 29/602.1 |
| 5,487,214 | 1/1996 | Walters | 29/602.1 |
| 5,541,610 | 7/1996 | Imanishi et al. | 343/702 |
| 5,618,611 | 4/1997 | Jin et al. | 428/209 |
| 5,619,791 | 4/1997 | Lambrecht et al. | 29/852 |
| 5,650,199 | 7/1997 | Chang et al. | 427/33 |
| 5,714,239 | 2/1998 | Maeda et al. | 428/209 |
| 5,821,846 | 10/1998 | Leigh et al. | 336/200 |
| 5,851,681 | 12/1998 | Matsuyama et al. | 428/473.5 |

FOREIGN PATENT DOCUMENTS

| | | | |
|---|---|---|---|
| 0690461 | 1/1996 | European Pat. Off. . | |
| 58-089819A | 5/1983 | Japan . | |
| 90-227908 | 2/1989 | Japan | H01B 1/16 |
| 95-77085 | 2/1989 | Japan | H01B 1/16 |
| 94-215621 | 1/1993 | Japan | H01B 1/16 |
| 1288992 | 9/1972 | United Kingdom . | |

OTHER PUBLICATIONS

B. Schwartz, "Bulk Ferrite Fabrication", IBM Technical Disclosure Bulletin, vol. 6, No. 10, p. 42 (1964).

Ono, A. et al., "The Technology of Electrode for Multilayer Chip Inductor (I)", Multilayer Component Division, TDK Corporation, 200 Tachisawa, Hirasawa, Nikaho–Machi, Akita 018–04, Japan, pp. 1–4.

U.S. application Serial No. 08/923591 issued to Fleming, D. A. et al., filed Sep. 14, 1997. (not attached).

*Primary Examiner*—Daniel J. Jenkins

*Attorney, Agent, or Firm*—Scott J. Rittman

[57] ABSTRACT

The invention provides an improved process for fabricating devices containing metallized magnetic ceramic material, such as inductors, transformers, and magnetic substrates. In particular, the unique vias utilized in the process of the invention allow fabrication of devices from multiple unfired ferrite layers with only a single via-coating step, thereby avoiding the need numerous punching steps. Moreover, there is no need for expanding the dimensions of the vias and thus no need for internal metallization. The invention therefore provides for green tape-type fabrication of devices such as inductors, transformers, and magnetic substrates in a manner faster, less complex, and more reliable than current methods. The invention also relates to use of an improved conductive material in such a process, the conductive material containing silver/palladium particles, ferrite particles, a cellulose-based or other organic binder, and a solvent. After firing of the substrate onto which the ink has been coated, and plating of copper thereon by a copper pyrophosphate bath, the plated copper exhibits a pull strength greater than about 4 kpsi, advantageously greater than about 5 kpsi. Use of a copper pyrophosphate bath also allow uniform plating within long, narrow vias.

12 Claims, 4 Drawing Sheets

PROCESS FOR FORMING DEVICE COMPRISING METALLIZED MAGNETIC SUBSTRATES

BACKGROUND OF THE INVENTION

1. Field of the Invention

The invention relates to fabrication of devices formed from metallized magnetic substrates, e.g., inductors, transformers, and substrates for power applications.

2. Discussion of the Related Art

Magnetic components such as inductors and transformers are widely employed in circuits requiring energy storage and conversion, impedance matching, filtering, electromagnetic interference suppression, voltage and current transformation, and resonance. These components tend to be bulky and expensive compared to the other components of a circuit. Early manufacturing methods typically involved wrapping conductive wire around a magnetic core element or an insulating body containing magnetic core material. These early methods resulted in circuit components with tall profiles, and such profiles restricted miniaturization of the devices in which the components were used. The size restriction was particularly problematic in power circuits such as power converters.

More recent efforts to improve upon these early manufacturing methods resulted in thick film techniques and multilayer green tape techniques. In a thick film technique, a sequence of thick film screen print operations are performed using a ferrite paste and a conductor paste. Specifically, individual ferrite layers are deposited as a paste to form a substrate, while the conductor paste is deposited between the individual ferrite paste layers to form conductive patterns through the interior of the substrate. Conductor paste is also printed onto the surfaces of the resulting multilayer ferrite substrate to connect the vias, thereby forming spiral windings. Upon firing, a consolidated body containing numerous devices is typically formed.

The green tape technique uses green tape layers composed of ferrite particles and organic binder to form the substrate. Typically, as shown in FIGS. 2A to 2C, numerous holes 22 are punched through each of several green tape layers 20 (for simultaneous formation of numerous devices). As shown in FIG. 2B, the side walls of the holes 22 are subsequently coated with a conductive material 24, and then the green tape layers 20 are stacked and laminated to form a substrate 30. As shown in FIG. 2C, conductor material 32 is printed onto the opposing surfaces of the multilayer substrate 30, and connected to the conductive material 24 coated onto the side walls of the holes 22, such that continuous, conductive windings are formed. The substrate 30 is fired to form a consolidated ceramic, and, typically, a metal such as copper is electroplated onto the windings to provide improved conductivity. Such green tape techniques experience problems, however. For example, due to the numerous, relatively small vias, it is sometimes difficult to attain a uniform electroplated layer in the vias due to mass transport limitations from the electroplating bath to the via surfaces. In addition, the adhesion of the electroplated layer on the conductive material is often problematic in green tape techniques.

Improved methods for forming devices that incorporate metallized magnetic substrates, such as inductors and transformers, are desired. Particularly desired are methods that offer improved fabrication speeds and device yields from a single multilayer substrate.

SUMMARY OF THE INVENTION

The invention provides an improved process for fabricating devices containing metallized magnetic ceramic material, such as inductors and transformers. In an embodiment of the invention, reflected in FIGS. 1A–1D, several layers of unfired magnetic material, typically ferrite tape, are provided. The vias 12, 13 of the invention are punched into the layers individually, at the same locations in each layer. Each via 12, 13, as initially punched, is capable of contacting two opposing windings, as reflected in FIG, 1C. (The vias 13 along the outer edges are referred to herein as outer vias, in contrast to the inner vias 12. These outer vias 13, due to their location along the edges of the substrate, are not intended to contact two opposing windings 16 of devices. It is possible, however, as reflected in FIGS. 1C and 1D, for an outer via 13 to contact both a winding 16 of a device and an opposing connection 15 to a bus 17.)

The layers are then stacked such that the vias 12, 13 are aligned, and the layers are laminated to form a substrate 10 of the unfired magnetic material. The side walls of the aligned vias 12, 13 are coated with a conductive material 14, e.g., a silver- and palladium-containing ink (the term ink indicating a viscosity of about 5,000 to about 300,000 cp). Then, without expanding the dimensions of the vias 12, 13, e.g., without an additional punching step that contacts the vias, the top and bottom surfaces of the substrate 10 are coated with a second conductive material 16 to connect the side wall coatings of adjacent vias 12, 13, thereby forming conductive windings. It is then possible to score the substrate 10, as shown in FIG. 1D, to ease subsequent separation of devices. The substrate is fired, and additional metal, e.g., copper, is electroplated over the conductive material to form the finished devices.

The invention represents an improvement over the type of green tape technique discussed in co-assigned U.S. patent application SER. No. 08/923591 (our reference Fleming-Johnson-Lambrecht-Law-Liptack-Roy-Thomson 13-49-831-3-20-36) (referred to herein as the '591 application), the disclosure of which is hereby incorporated by reference. As reflected in FIGS. 3A to 3D, the '591 application discloses a method involving the following steps: (a) punching vias 42 in individual green ferrite sheets 40, (b) coating the side walls of the vias 42 of each sheet 40 with a conductive material 44, (c) punching large apertures 46 that intersect the vias 42 in each sheet 40 and thereby expand the dimensions of the vias 42, (d) laminating the sheets 40 with the vias 42 aligned to form a substrate 50, and (e) coating the surfaces of the substrate 50 with a second conductive material 48 to connect the coating 44 of the via 42 side walls, thereby forming windings. (Alternatively, the steps of punching the vias and punching the apertures are interchanged.) The substrate is then fired, and a metal, e.g., copper, is electroplated over the metal ink. The apertures 46 are needed to open up access to the interior of the substrate 50, because uniform electroplating is difficult to attain in the small, narrow vias 42. In practice, it is necessary, before laminating the sheets 40 in step (d), to coat the surface of internal sheets with a conductive material, i.e., provide internal metallization, to connect the exposed vias with an external electroplating bus. This internal metallization is required to distribute current for electroplating because the apertures 46, as shown in FIG. 3C, create discontinuities in the first and second conductive materials 44, 48. Unfortunately, the time and expense required to provide such internal metallization, including the cost of the metal itself (Pd and Ag are commonly used), is typically disadvantageous. Also, the presence of the internal metallization demands a greater spacing between individual devices in a substrate, thereby reducing the number of devices capable of being produced in a single substrate. And the internal metallization is not always adequate to provide uniform plating, due to the difficulty in attaining good connectivity between the external and internal metallization.

In contrast to the above process, the present invention's use of vias capable of contacting two opposing winding (see FIG. 1C) allows for device fabrication using only a single punching step for each green tape layer. The single punching step in turn makes it possible to laminate all the unfired layers prior to coating the side walls of the vias, such that the vias of all the tape layers are coated simultaneously. Moreover, since no apertures are punched, i.e., the via dimensions are not expanded, there is no need for internal metallization. The invention thereby provides for green tape fabrication of devices in a manner faster and less complex than the above method.

The invention also relates to use of an improved conductive material to coat the surfaces of the ferrite substrates and the inner walls of the vias. The conductive material, which is applied as a conductive ink, contains silver/palladium particles, ferrite particles, an organic based binder (advantageously cellulose-based), and a solvent. (As used herein, silver/palladium particles indicates the presence of silver particles and palladium particles or of silver-palladium alloy particles.) Surprisingly, when copper is electroplated onto this improved conductive material using a copper pyrophosphate bath, the plated copper advantageously exhibits a pull strength of about 5 kpsi. By contrast, use of a conventional copper sulfate acid bath typically provides pull strengths of about 2 kpsi or less. (Pull strength indicates the strength of 0.08 inch diameter, 125 μm thick copper dots electroplated onto fired conductive material, the strength measured by attaching copper studs to the dots with epoxy and measuring the pull strength by conventional methods.) In addition, it was found that use of the copper pyrophosphate bath was effective in uniformly electroplating the side walls of multilayer laminates, i.e., uniformly electroplating narrow, deep vias.

DETAILED DESCRIPTION OF THE INVENTION

An embodiment of the process of the invention is shown in FIGS. 1A–1D. Several green tape layers of a magnetic material are provided. It is possible to use a single layer, but greater than two layers are typically used. The magnetic material is selected from any magnetic material capable of being metallized, e.g., magnetic ceramics and polymers loaded with magnetic particles, and typically has a magnetic permeability of about 400 to about 1000, and an electrical resistivity greater than about $10^6$ ohm-cm. Green tape indicates a flexible material containing an organic binder and particles of the magnetic material. Typically, the tape contains about 8 to about 10 weight percent binder, based on the weight of the tape, with the remainder composed of a ceramic powder. Advantageously, the magnetic material is a spinel ferrite of the form $M_{1+x}Fe_{2-x}O_{4-z}$, where x and z range from −0.1 to +0.1. M is typically at least one of manganese, magnesium, nickel, zinc, iron, copper, cobalt, vanadium, cadmium, and chromium. Advantageous ferrites are those exhibiting relatively high resistivities, e.g., about $10^4$ ohm-cm or higher, such as nickel-zinc ferrites and certain manganese-zinc ferrites, which are also known as soft ferrites. (Soft magnetic materials such as soft ferrites have coercivity less than about 10 Oe and are typically demagnetized in the absence of an external magnetic field.) Other suitable ferrites include so-called microwave ferrites, e.g., the garnet structure, or so-called square-loop ferrites, e.g., where M is manganese or magnesium. (Microwave ferrites are used for devices such as microwave circulators at frequencies in the range of 0.5 to 50 GHz. Square-loop ferrites exhibit a hysteresis loop with moderate coercivity and moderate remanence, and thus are capable of both retaining a flux density and being demagnetized in moderate magnetic fields.)

Figure 1A:
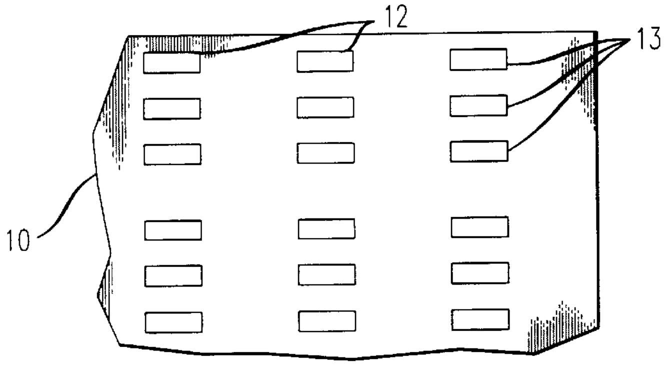
FIGS. 1A to 1D show one embodiment of the invention.

As shown in FIG. 1A, vias 12, 13 are punched into each green tape layer, at the same locations in each, and the layers are then stacked and laminated to form a multilayer substrate 10. Some of the vias 13 will be located along outer edges of the substrate (the left and right edges of the substrate shown in FIG. 1A). As mentioned previously, these vias 13 along the outer edges are referred to herein as outer vias, in contrast to the inner vias 12. These outer vias 13, due to their location along the edges of the substrate, are not intended to contact two opposing windings of devices. Typically, however, as reflected in FIGS. 1C and 1D, an outer via 13 will contact both a winding 16 of a device and an opposing connection 15 to a bus 17. The bus distributes the needed current during electroplating. While rectangular vias are shown in the Figures, it is possible to form vias of a variety of geometries, e.g., square, circular, eliptical. Vias having aspect ratios (i.e., the ratio of the long to short axis) of about 1 to about 4 have been found to be useful. Vias 12, 13 are typically formed by placing the green tape layers in a suitable punch press. For green tapes formed from ceramic powder and organic binder, it is possible to laminate several layers of tape by pressing the layers together at a relatively low pressure, e.g., 250–3000 psi, at a temperature of about 50–100° C. To provide proper alignment of multiple layers, registration holes are typically punched in each layer during via formation, and registration rods are then placed through the holes to align the layers prior to lamination.

Figure 1B:
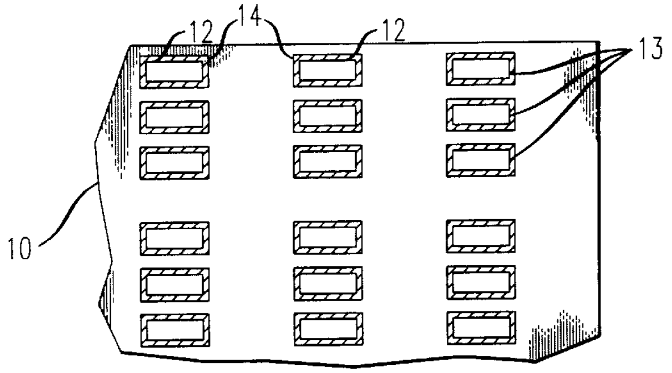

As shown in FIG. 1B, the side walls of the vias 12, 13 are coated with a first conductive material 14, e.g., a conductive ink. (The conductive material typically has a resistivity less than $10^{-4}$ ohm-cm after firing.) The coating step advantageously results in formation of continuous side walls. (A few discontinuities, e.g. pinholes, are acceptable as long as the post-fired conductive material is capable of being electroplated.) Useful conductive inks include those containing silver and/or palladium particles, or silver-palladium alloy particles (the silver and palladium generally used in a 70Ag:30 Pd weight ratio). Typically, conductive inks contain the metal as a particulate suspension in an organic binder, such that the ink is capable of being coated or screen printed. To coat the side walls of the vias 12, 13 the first conductive material 14 is normally drawn through the vias using vacuum suction, optionally using a coating mask cut to match the via pattern in substrate 10. Other coating or deposition methods are also possible.

Figure 1C:
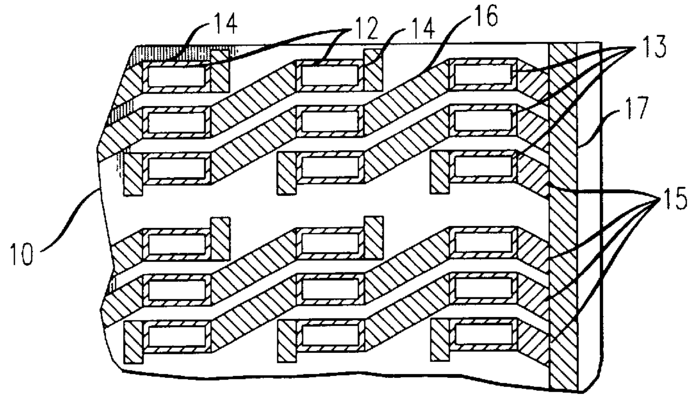

As shown in FIG. 1C, following coating of inner side walls of vias 12, 13, the top and bottom surfaces of the substrate 10 are coated with a second conductive material 16, having post-fired properties similar to the first conductive material 14. Typically, the second conductive material 16 is screen printed to form a desired metallization pattern, e.g., windings, circuit lines, and surface mount pads. The pattern formed from the second conductive material 16 contacts the material 14 coated onto the side walls of the vias 12, 13, thereby forming continuous, conductive windings. As reflected in FIG. 1C, no expansion of the dimensions of the vias are needed, e.g., the vias 12, as initially punched, are capable of contacting two opposing windings. (The description of "no expansion of the dimensions of the vias" means that no affirmative expansion is performed, e.g., by further punching steps. Expansion of the vias due to other process steps, e.g., heat expansion during firing, is contemplated.) It is also possible to provide the surface coating of conductive material prior to lamination, and/or prior to via side wall coating. A bus 17 is also formed, along with contacts 15 from the bus 17 to the first conductive material 14 deposited in the outer vias 13.

Figure 1D:
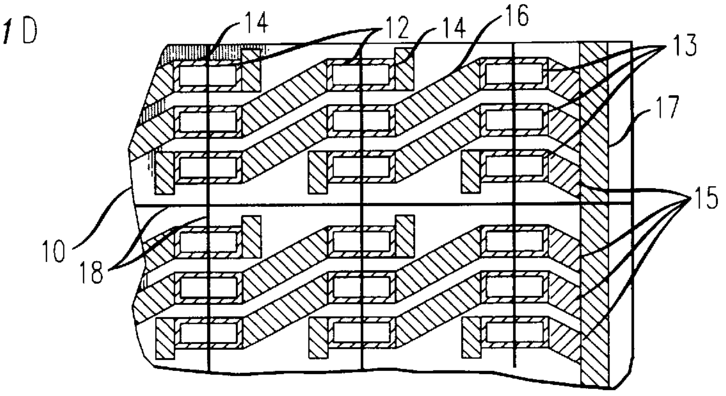
Figure 2A:
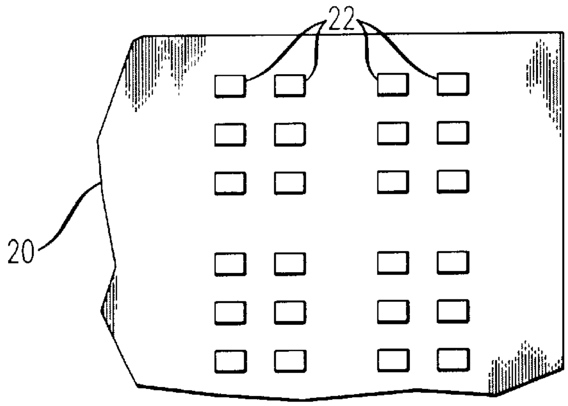
FIG. 2A (PRIOR ART)
FIGS. 2A to 2C show a prior art method for forming devices.
Figure 2B:
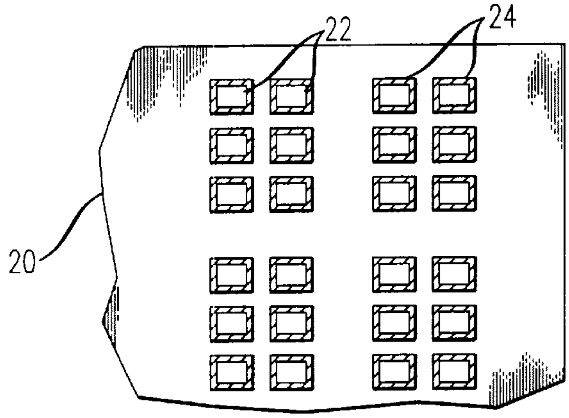
FIG. 2B (PRIOR ART)
Figure 2C:
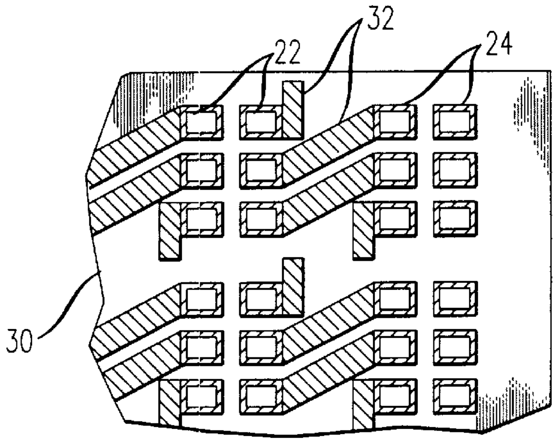
FIG. 2C (PRIOR ART)
Figure 3A:
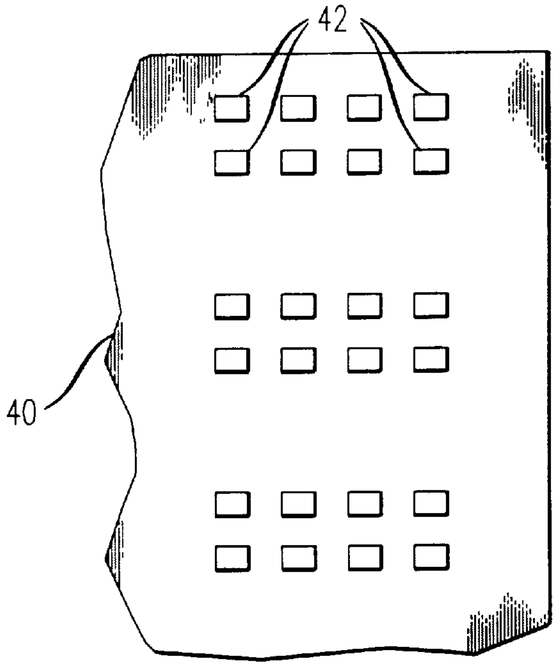
FIGS. 3A to 3D show an alternative green tape method for forming devices.
Figure 3B:
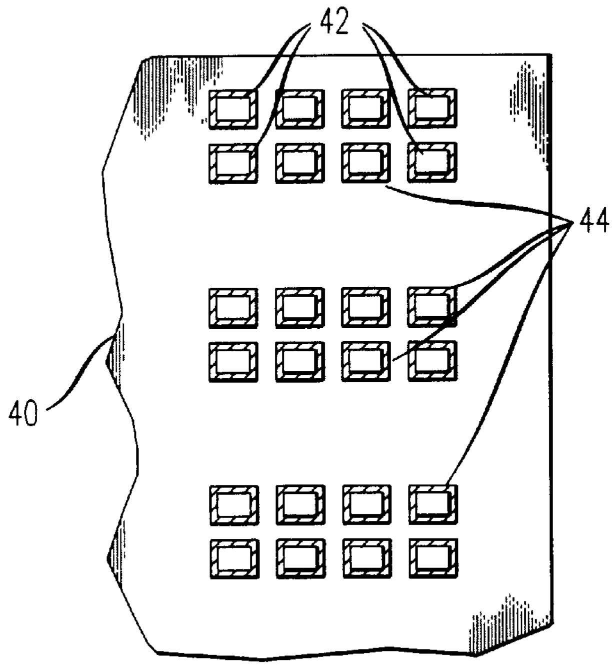
Figure 3C:
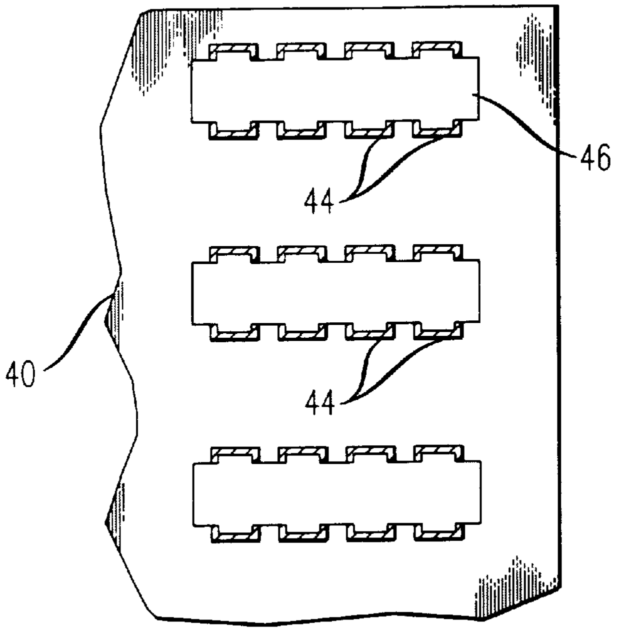
Figure 3D:
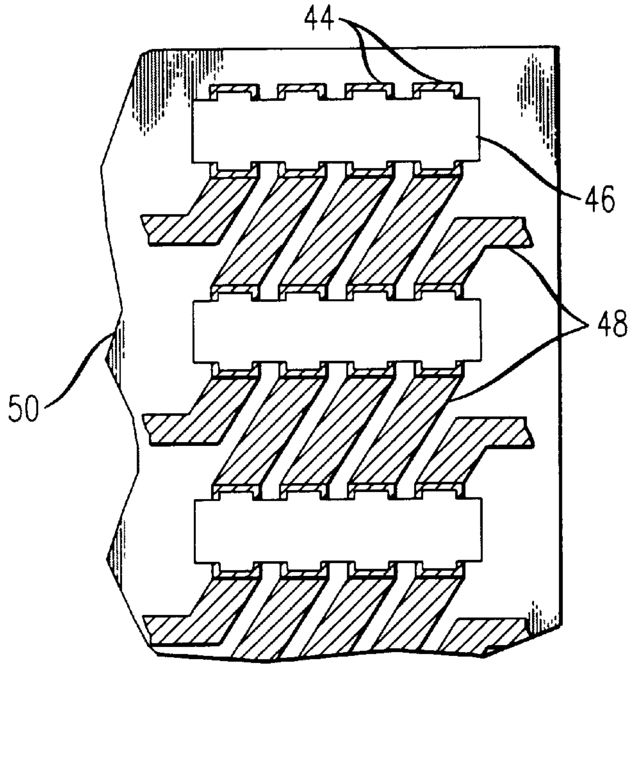

The second conductive material 16 is advantageously a conductive ink similar to the first conductive material 14 used to coat the inner side walls of the vias 12. Where the substrate 10 is formed from a ferrite, it is advantageous for the first conductive material 14 and the second conductive material 16 to be silver- and palladium-containing ink that contains ferrite particles and an organic binder, advantageously a cellulose-based binder, this conductive ink discussed in detail below. Advantageously, the ink contains the same type ferrite as the substrate to improve adhesion to the substrate upon firing. When such a silver- and palladium-containing ink is used for the second conductive material 16, the ink is typically screen printed to a wet thickness of 25 to 75 $\mu$m. Subsequent to forming the surface metallization, it is advantageous to scribe dice lines 18 into the green tape 10, as shown in FIG. 1D, to facilitate separation of devices subsequent to sintering of the article. It is also possible to omit the dice lines, and instead saw the devices apart after sintering is complete.

After the windings are formed in the substrate 10, the substrate 10 is fired. Firing drives solvent and binder from the first and second conductive material 14, 16, thereby adhering the metal particles to the substrate 10, and the firing also sinters the substrate 10 to a dense ceramic. Copper is then electroplated onto the fired conductive material 14, 16, generally to a thickness of about 1 to about 10 mils, to form the final devices. The bus 17 and contacts 15 to the outer vias 13 provide the needed current during electroplating. It is possible to use a variety of conventional electroplating baths to deposit the copper onto the conductive material, and such baths are discussed generally in Metal Finishing Guidebook, Vol. 94, No. 1A, 1996. Other conductive plating materials are also possible. Electroless plating is possible, but is typically slower and incapable of adequately providing a plating of desired thickness.

The first and second conductive materials discussed in the embodiment above are advantageously a conductive ink containing silver/palladium particles, ferrite particles, an organic binder, and a solvent, where the solvent primarily solvates the binder. Use of ferrite particles are advantageous for improving adhesion of subsequent electroplating deposits on the conductive material, and for reducing the amount of costly silver and palladium material that is required. The silver/palladium particles are typically used in a weight ratio of 60–80 Ag:40–20 Pd (typically 70 Ag:30 Pd), and have an average diameter of about 1 $\mu$m. The improved ink advantageously contains about 10 to about 50 wt. % ferrite particles, more advantageously about 20 to about 40 wt. %, in the post-fired material (i.e., based on the weight of the ferrite and conductive particles). Less than 10 wt. % ferrite particles typically results in an undesirably small increase in adhesion strength and cost reduction, while greater than 50 wt. % ferrite particles typically results in undesirably high electrical resistivity, which interferes with subsequent electroplating. The ferrite particles typically have an average diameter of about 0.2 to about 2.0 $\mu$m, advantageously about 1.5 $\mu$m. The ink typically contains about 1 to about 3 wt. % of the organic binder, and about 10 to about 40 wt. % of the solvent, based on the weight prior to firing. At lower amounts of binder and solvent, the viscosity of the ink is typically too high to use in the process described above, while at higher amounts, the viscosity is typically too low. The organic binder provides desired rheology and strength to the green structure. The binder is advantageously cellulose-based and more advantageously ethyl cellulose. A variety of solvents are useful, including $\alpha$-terpineol and mineral spirits.

It is possible to fabricate the improved conductive ink by a variety of processes. In one such process, the binder is dissolved in a first solvent until substantially wet by the solvent. Particles of the ferrite and the conductive material are separately mixed with a second solvent (which is the same or different than the first solvent), e.g., ethanol, and typically a small amount, e.g., less than 1 wt. %, of a dispersant material such as oleic acid or another fatty acid. Once the powder mixture has settled, about 50–70 wt. % of the solvent is extracted. The appropriate amount of the binder solution is added to the metal powder to provide the desired amount of the binder material in the metal ink. Typically an additional amount of solvent is then added, and the components are mixed to provide the conductive ink. Viscosity of the ink is typically adjusted by altering the amount of solvent and/or binder. It is possible to use a control sample to determine the appropriate amounts of the components to provide a desired result. Normally, a less viscous ink is desired when plating the side walls of vias, e.g., 5,000 to 50,000 cp, whereas a more viscous ink, e.g., 30,000 to 300,000 cp, is useful for screen printing onto a surface of a ferrite substrate.

It was found that use of this improved conductive ink in combination with copper electroplating by a copper pyrophosphate bath provided desirable pull strengths for the plated copper. In particular, copper plated in this manner advantageously exhibits a pull strength greater than about 4 kpsi, more advantageously above 5 kpsi. (Pull strengths were measured as described in Comparative Example 1 and Example 3 below.)

A copper pyrophosphate bath generally contains four components. Copper pyrophosphate is the source of copper and a complexing ion. Potassium pyrophosphate further provides a complexing ion, and an amount of free pyrophosphate required for plating. Potassium nitrate provides for good anode corrosion. And ammonia (typically introduced as ammonium hydroxide) provides morphology control of the plated deposit. Typically, conventional pH adjusting compounds are also used. A useful, commercially-available pH lowering compound is "Compound 4A" available from ATOTECH, and pyrophosphoric acid is similarly suitable. A useful pH raising compound is potassium hydroxide. Optionally, an additive is included to provide leveled, bright deposits, such additives commercially known and available. One such additive is additive PY61H, available from ATOTECH. Typically, leveler/brighteners consist of materials having organic backbones with attached alkoxy and/or hydroxyl groups.

A variety of parameters have been found to be particularly useful for plating copper on devices, particularly in the process for forming devices discussed above, utilizing copper pyrophosphate plating baths. The temperature of the bath is advantageously 50 to 55° C. Below 50° C., the quality of the deposit is reduced, and above 55° C., pyrophosphate undesirably begins rapid conversion to orthophosphate. The pH of the bath is advantageously 7.8 to 8.5, more advantageously 8.0 to 8.5. At pH values below 7.8, pyrophosphate undesirably begins rapid conversion to orthophosphate. At pH values above 8.5 the quality of the deposit is reduced. Anodes are advantageously oxygen-free copper. The ammonia is advantageously present in an amount ranging from 6 to 10 mL per L of bath solution. At lower ammonia concentrations, line definition is typically poor and spreading of the deposit from the conductive material onto the substrate occurs. At higher ammonia concentrations, the deposit tends to exhibit undesirable internal stresses. The orthophosphate concentration is advantageously less than 60 g/L, above which the orthophosphate lowers the quality of the plated deposit. The ammonium nitrate is advantageously present at a concentration of 8 to 12 g/L, within which desirable plating efficiency is attained. The ratio of pyrophospate to copper is advantageously 7.7 to 8.5. The copper concentration is advantageously 19.0 to 25.0 g/L. Plating is advantageously performed at a current density of 25 to 50 ASF (amperes per square foot). It is possible to use a control sample to determine the particular parameters that will provide a desired result.

A useful, commercially available copper pyrophosphate bath is the UNICHROME™ bath made by ATOTECH.

In the invention, it was found that use of copper pyrophosphate electroplating provided adequate uniformity of copper on the via side walls, even with deep, narrow vias having a large depth to width ratio. Thus, there is no need to punch large apertures to provide adequate electroplating, as in U.S. patent application Ser. No. 08/923591, referenced previously. And without the apertures, there is no need for internal metallization to provide electrical contact during electroplating. Eliminating the internal metallization reduces the complexity and cost of the process by removing the steps of printing metallization on internal green tape layers. A lack of internal metallization also improves the yield of the process because the devices are able to be spaced closer together, and faults due to poor connectivity between internal and external metallization are reduced.

The invention will be further clarified by the following examples, which are intended to be exemplary.

EXAMPLE 1

Formation of Silver- and Palladium-containing Conductive Inks Containing Ferrite Particles:

A binder solution was formed by dissolving ethyl cellulose in octerpineol, at a cellulose-terpineol weight ratio of between 1:10 and 1:12. The mixture was allowed to stand until the ethyl cellulose was substantially wet. The mixture was then passed through a 3-roll mill to further mix and homogenize the solution.

Silver and palladium particles (70:30 weight ratio) and ferrite particles (the metal particles having average diameters of about 1 $\mu$m) were mixed with ethanol, in an amount approximately half the total weight of the metal particles, and 0.5 wt. % oleic acid was then added. (The amount of each type of metal was determined based on the desired ferrite loading.) The mixture was then ultrasonicated for about 5 minutes. After several hours of settling of the metal particle mixture, about 60 wt. % solvent was extracted. The metal powder, however, was not allowed to dry.

The amount of binder solution needed to provide about 1.8 wt. % ethyl cellulose, based on the weight of the total ink (metal, ferrite, binder, and solvent) was determined, and that determined amount was added to the metal powder. The mixture was manually mixed and placed onto a slow roller mill for homogenization. The mixture was placed onto a 3-roll mill to evaporate the ethanol and obtain a desired viscosity. If necessary, additional $\alpha$-terpineol was added to adjust the viscosity.

As prepared, the ink contained 74±2 wt. % metal powders and 1.8±0.1 wt. % ethyl cellulose, based on the weight of the overall ink composition.

EXAMPLE 2

Formation of a Device

An array of four turn, three layer surface mountable inductors was prepared in the following manner. Three 5"×5"×0.29" green, nickel-zinc ferrite (approximately $Ni_{0.4}Zn_{0.6}Fe_2O_4$) tape layers were provided. Each tape contained ferrite powder and about 8 to about 10 wt. % organic binder. Vias having dimensions of 0.30"×0.35" were punched in each tape layer individually, such that two adjacent devices would share four vias. Registration holes were also punched in each layer to allow subsequent stacking of the layers. Planar conductor patterns (for windings and surface mount pads of the inductors), plating buss interconnects, and reference marks for scoring between the devices (to promote later separation) were provided on the top surface of the first tape layer and the bottom surface of the third tape layer. The planar conductor patterns and buss interconnects were formed from a silver- and palladium-containing ink made according to Example 1, containing 35 wt. % ferrite particles and 2 wt. % ethyl cellulose binder, with $\alpha$-terpineol included to provide a desired viscosity.

The three tape layers were then stacked on a steel registration fixture and laminated together at a temperature of about 80 to about 90° C. and a pressure of about 250 to about 500 psi. Lamination caused the binder of the three layers to soften and fuse, thereby forming a relatively strong monolithic array. The side walls of the vias were then coated with the same metal ink used for the surface metallization. The viscosity of the ink was reduced beyond that used for the above printing step by addition of $\alpha$-terpineol. The side walls were coated by drawing the ink through the vias with vacuum, to leave a coating on the side walls. After the ink dried, the array was scored on its top and bottom surfaces (as reflected in FIG. 1D) to promote singulation of the inductors subsequent to sintering and electroplating.

To co-sinter the ferrite and metal components, the array was placed on a flat Alundum® setter that was dusted with a sintered ferrite powder of the same composition (to prevent the substrate from sticking to the Alundum™M). The array was then heated from room temperature to 500° C. over about 24 hours to volatilize the organic components of the tape and ink in a controlled manner. The temperature was further raised to about 1100° C. over about 24 hours, including a four hour treatment at about 1100° C. and cooling to room temperature. All heating was performed in a flowing air atmosphere (2.5 L/minute).

Plating of the fired array was performed in a copper pyrophosphate bath similar to the bath of Example 3, at 25 ASF, to a thickness of 0.005".

COMPARATIVE EXAMPLE 1

Pull Strength Measurements Using Copper Plated in Copper Sulfate Acid Bath

A set of 0.08 inch diameter dots was patterned onto a green ferrite tape, using conductive ink made according to the process of Example 1, having the ferrite loading discussed below. The tape was then fired in air at about 1100° C. for 4 hours. Copper was electroplated onto the dots to a thickness of 125 $\mu$m. The electroplating was performed in a copper sulfate acid bath at 25 ASF and room temperature. The bath contained 58.9 g/L of $CuSO_4$, 120.0 mL/L of $H_2SO_4$, 3.0 mL/L of ATOTECH Cupracid Brightener, 15 mL/L of ATOTECH Cupracid BL-CT Basic Leveler, and 0.14 mL/L of HCl. Plating was performed at 25 ASF and room temperature. Copper studs were then attached to the copper dots with epoxy, and the pull strength was measured in a conventional manner using a Sebastian pull test apparatus.

This process was repeated for 8 samples using an ink containing 5 wt. % ferrite, based on the weight of the ink, and 8 samples using an ink containing 25 wt. % ferrite, based on the weight of the ink. For the 5 wt. % ferrite ink, the average pull strength was 1.70 kpsi, with a standard deviation of 74.00%. For two 25 wt. % ferrite samples, the average pull strengths were 1.26 kpsi with a standard deviation of 52.70%, and 1.68 kpsi with a standard deviation of 32.30%.

EXAMPLE 3

Pull Strength Measurements Using Copper Plated in Pyrophosphate Bath

A set of 0.08 inch dots was patterned onto a green ferrite tape, using conductive ink made according to the process of Example 1 with a ferrite loading of 25 wt. % based on the weight of the fired ink. The tape was then fired in air at 1115° C. for 4 hours. Copper was plated onto the dots to a thickness of 125 μm. The plating was performed in a copper pyrophosphate bath under the following conditions:

Bath:

210 mL of ATOTECH C-10 (66.7 g/L Cu; 499.5 g/L $P_2O_7$);

1980 mL of ATOTECH C-11 (481.5 g/L $P_2O_7$);

54 mL of $NH_4OH$;

Initial pH of 10.10, adjusted and maintained at 8.15 by addition of pyrophosphoric acid.

Plating Conditions:

Temperature: 52° C.;

30 minutes at 5 ASF, followed by 200 minutes at 25 ASF.

Copper studs were then attached to the copper dots with epoxy, and the pull strength was measured in a conventional manner using a Sebastian pull test apparatus.

Nine samples were prepared in this manner. The average pull strength for the nine samples was 5.413±0.434 kpsi

What is claimed is:

1. A process for fabricating devices, comprising the steps of:

providing one or more layers of unfired magnetic material;

forming inner and outer vias in the one or more layers, the vias having side walls;

laminating, if more than one layer is provided, the layers such that the vias of the layers are aligned to form a substrate of unfired magnetic material;

coating at least a portion of the side walls of the vias with a first conductive material; and without expanding the dimensions of the vias, coating portions of a first surface and a second surface of the substrate or layer with a second conductive material such that the second conductive material contacts the first conductive material to form windings around a portion of the substrate or layer, wherein the inner vias contact two opposing windings of devices.

2. The process of claim 1, wherein two or more layers of unfired magnetic material are provided.

3. The process of claim 1, wherein the unfired magnetic material comprises a ferrite.

4. The process of claim 3, wherein the ferrite is represented by $M_{1+x} Fe_{2-x} O_{4-z}$, where x and z range from −0.1 to +0.1, and where M is at least one of manganese, magnesium, nickel, zinc, iron, copper, cobalt, vanadium, cadmium, and chromium.

5. The process of claim 1, further comprising the steps of:

firing the substrate or layer subsequent to forming the conductive windings; and depositing additional metal on the conductive windings.

6. The process of claim 5, wherein the additional metal comprises copper and is deposited on the conductive windings by electroplating.

7. The process of claim 6, wherein the electroplating is performed in a copper pyrophosphate bath.

8. The process of claim 7, wherein more than two layers of unfired magnetic material are provided, and the internal layer or layers of the substrate are free of metallization intersecting the vias.

9. The process of claim 1, wherein the first conductive material and the second conductive material comprise silver/palladium particles and ferrite particles.

10. The process of claim 9, wherein the first conductive material and the second conductive material comprise about 1 to about 3 wt. % of an organic binder, based on the weight of the materials prior to a firing step, and about 10 to about 50 wt. % ferrite particles, based on the weight of the silver/palladium particles and ferrite particles.

11. The process of claim 10, wherein the binder is ethyl cellulose.

12. The process of claim 1, wherein the device is selected from an inductor, transformer, or magnetic substrate.

* * * * *